United States Patent [19]
Katogi et al.

[11] Patent Number: 6,036,612
[45] Date of Patent: Mar. 14, 2000

[54] HYDRAULIC AUTOTENSIONER UNIT HAVING AN EXTERNAL SPRING ENCIRCLING AN ACTUATOR CYLINDER

[75] Inventors: Sadaji Katogi; Yoshikazu Hida, both of Iwata, Japan

[73] Assignee: NTN Corporation, Osaka, Japan

[21] Appl. No.: 08/756,801

[22] Filed: Nov. 26, 1996

[30] Foreign Application Priority Data

Dec. 27, 1995 [JP] Japan .................................. 7-340512

[51] Int. Cl.⁷ .............................. F16H 7/08; F16H 7/12
[52] U.S. Cl. ........................ 474/110; 474/109; 474/101
[58] Field of Search .................................. 474/101, 109, 474/110; 267/179, 34; 188/321.11

[56] References Cited

U.S. PATENT DOCUMENTS

| | | | |
|---|---|---|---|
| 3,455,178 | 7/1969 | Rouff et al. | 267/34 X |
| 4,036,335 | 7/1977 | Thompson et al. | 267/34 X |
| 4,367,968 | 1/1983 | Ishida | 188/321.11 X |
| 4,438,908 | 3/1984 | Terada | 188/321.11 X |
| 4,925,436 | 5/1990 | Hayashi et al. | 474/101 |
| 4,950,209 | 8/1990 | Kawashima et al. | 474/138 |
| 4,962,834 | 10/1990 | Miner | 188/321.11 |
| 4,976,660 | 12/1990 | Breindl | 474/135 |
| 4,997,410 | 3/1991 | Polster et al. | 474/110 |
| 5,026,330 | 6/1991 | Zermati et al. | 474/138 |
| 5,222,580 | 6/1993 | Wang | 188/321.11 |
| 5,383,813 | 1/1995 | Odai | 474/110 |
| 5,482,262 | 1/1996 | Hayakawa et al. | 267/226 |
| 5,647,813 | 7/1997 | Serkh | 474/101 X |
| 5,700,216 | 12/1997 | Simpson et al. | 474/110 |
| 5,707,309 | 1/1998 | Simpson | 474/110 |

FOREIGN PATENT DOCUMENTS

| 20866 | 8/1956 | Germany | 267/34 |
|---|---|---|---|

*Primary Examiner*—Daniel P. Stodola
*Assistant Examiner*—Gregory J. Strimbu
*Attorney, Agent, or Firm*—Wenderoth, Lind & Ponack, L.L.P.

[57] ABSTRACT

A hydraulic autotensioner unit having an actuator which can be assembled easily and which can use a spring having a large coil diameter and thus a large spring constant. The autotensioner includes a pivotable arm and a tension pulley rotatably supported on the arm. The actuator is coupled to the arm to press the tension pulley against a belt. The actuator has a cylinder, a rod inserted in the cylinder, and a hydraulic damper mechanism mounted in the cylinder to damp the pushing force applied to the rod when it is pushed into the cylinder. The spring is provided around the cylinder, so that its size is not limited by a housing. A spring seat is fixed to one end of the rod by a pin. The spring seat is coupled to an engine block by a coupling piece. The spring and the spring seat can be mounted after mounting the hydraulic damper within the cylinder, so that the actuator can be assembled easily.

23 Claims, 5 Drawing Sheets

HYDRAULIC AUTOTENSIONER UNIT HAVING AN EXTERNAL SPRING ENCIRCLING AN ACTUATOR CYLINDER

BACKGROUND OF THE INVENTION

This invention relates to a hydraulic autotensioner unit for adjusting the tension in a belt, especially a belt for driving auxiliary equipment such as an alternator, for an engine.

U.S. Pat. No. 4,790,801 and Unexamined Japanese PCT Publication No. 2-500210 disclose hydraulic autotensioner units comprising an arm having one end pivotally mounted on an engine block, a tension pulley rotatably supported on the free end of the arm, and an actuator coupled to the arm to bias it in a direction to stretch the belt, thus keeping constant the tension of the belt.

The actuator mounted in this type of hydraulic autotensioner has a cylinder, a rod inserted in the cylinder, a spring for creating a biasing force that causes the rod to protrude from the cylinder, and a hydraulic damper mechanism mounted in the cylinder for damping the movement of the rod when it is pushed into the cylinder. The spring and the hydraulic damper mechanism cooperate to reduce any variation in tension in the belt running around the tension pulley, thus keeping the tension in the belt constant.

Such a conventional hydraulic autotensioner unit has spring housed in the cylinder, so that its size is limited. In this arrangement, it is impossible to use a spring having a large coil diameter or having a low spring constant. Consequently, the application of a sufficiently high tension to the belt or a minimization of variations in the tension of the belt also become impossible.

One way to use a spring with either a large spring constant or a large coil diameter is to provide such a spring outside the cylinder. But the spring provided outside the cylinder will complicate the mechanism for coupling the actuator to the arm and make assembling of the actuator difficult.

An object of this invention is to provide a hydraulic autotensioner unit having an actuator which can use a spring that has a low spring constant but still is capable of applying a sufficiently high tension to the belt, and which can be assembled easily.

SUMMARY OF THE INVENTION

According to this invention, there is provided a hydraulic autotensioner unit comprising an arm pivotally mounted on a stationary member, a tension pulley rotatably mounted on one end of the arm, and an actuator coupled to the arm for biasing the arm and the tension pulley to apply a tension to a belt wound around the tension pulley, the actuator comprising a cylinder, a rod inserted in the cylinder, a spring for biasing the rod to move with respect to the cylinder, a hydraulic damper means for damping a pushing force applied to the rod when the rod is pushed into the cylinder, the spring being provided around the cylinder, a spring seat mounted on one end of the rod and having a first hole through which one end of the rod is inserted, and a second hole crossing the first hole, a pin inserted in the second hole and extending through a diametric hole formed in the rod near the one end thereof to couple the spring seat to the rod to bear the biasing force of the spring, a first coupling piece provided on one of the spring seat and the cylinder for coupling the one to the stationary member by the tightening of a bolt, and a second coupling piece provided on the other of the spring seat and the cylinder for coupling the other to the arm by means of a pin.

According to another embodiment of the present invention, there is provided a hydraulic autotensioner unit comprising an arm pivotally mounted on a stationary member, a tension pulley rotatably mounted on one end of the arm, and an actuator coupled to the arm for biasing the arm and the tension pulley to apply a tension to a belt wound around the tension pulley, the actuator comprising a cylinder, a rod inserted in the cylinder, a spring for biasing the rod to move with respect to the cylinder, a hydraulic damper means for damping a pushing force applied to the rod when the rod is pushed into the cylinder, the spring being provided around the cylinder, a flange provided at one end of the cylinder for supporting one end of the spring, a first coupling piece provided at the one end of the cylinder for coupling the cylinder to the arm, the rod being formed with a groove near one end thereof and a diametric hole, a spring seat mounted on the rod in the groove for supporting the other end of the spring, the rod extending through the spring seat and protruding upwardly from the spring seat, a second coupling piece mounted on the one end of the rod and formed with a first hole in which is inserted the one end of the rod, a second hole crossing the first hole, and a third hole, a pin extending through the diametric hole and inserted in the second hole to couple the second coupling piece to the rod, and a tubular pivot shaft inserted in the third hole and adapted to be fixed to the stationary member by the tightening of a bolt.

Other features and objects of the present invention will become apparent from the following description made with reference to the accompanying drawings.

DETAILED DESCRIPTION OF THE PREFERRED EMBODIMENT

Figure 1:
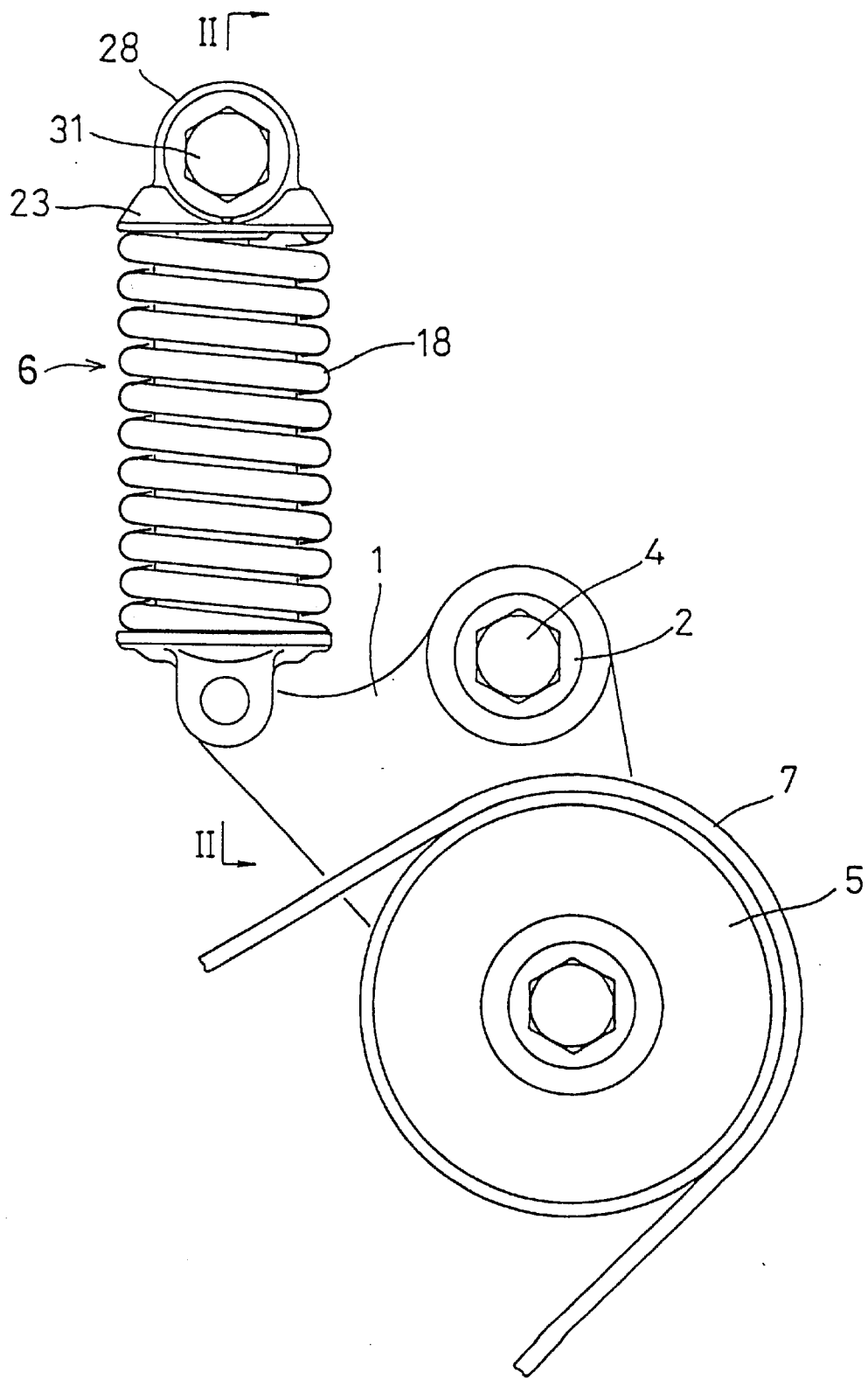
FIG. 1 is a front view of an embodiment of this invention.
Figure 2:
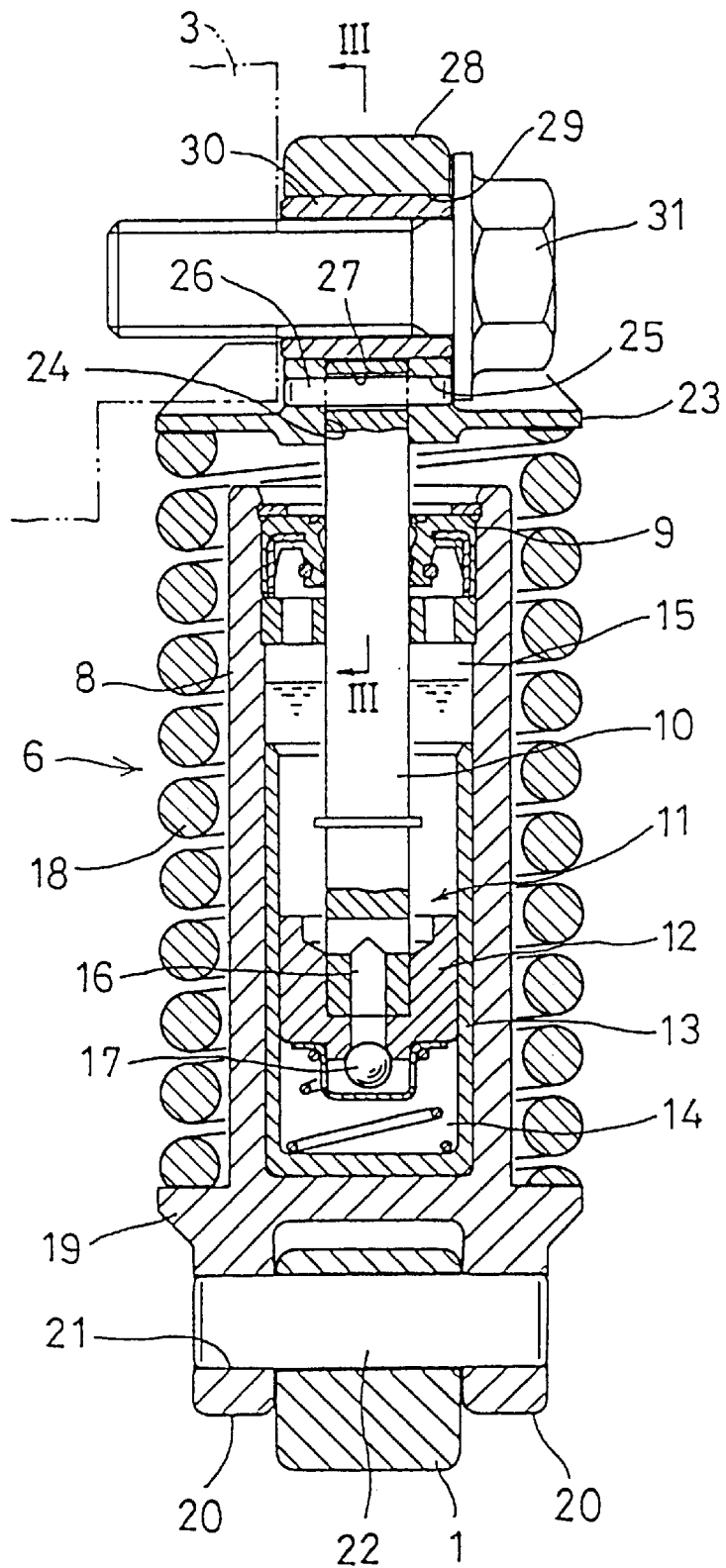
FIG. 2 is a partially sectional view taken along line II—II of FIG. 1.
Figure 3:
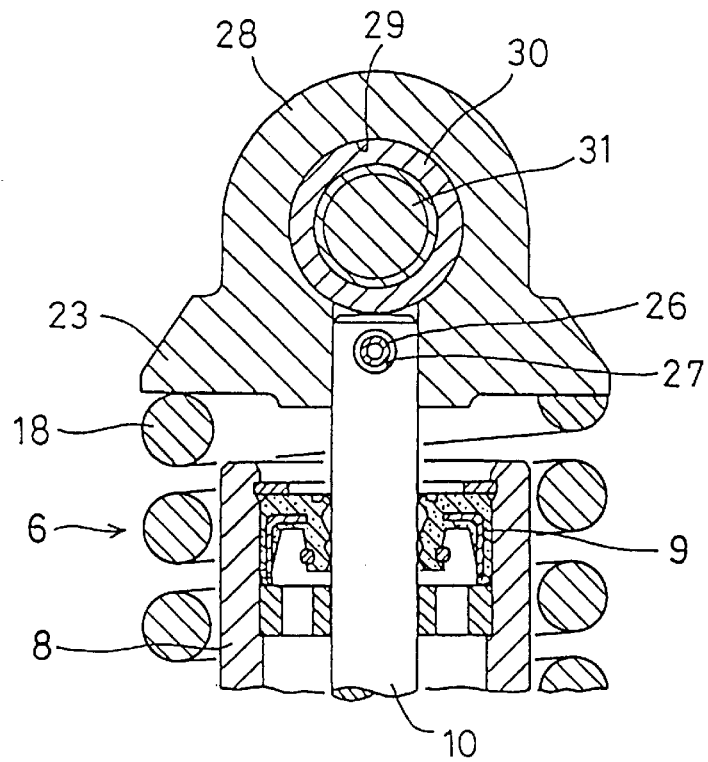
FIG. 3 is a partially sectional view taken along line III—III of FIG. 2.

As shown in FIG. 1, an arm 1 is pivotable about a pivot 2 which is fastened to a stationary member, i.e. an engine block, shown by chain line in FIG. 2, by tightening a bolt 4.

A tension pulley 5 is rotatably supported on the free end of the arm 1. An actuator 6 is coupled to the arm 1 to apply a constant tension to a belt 7 through the arm 1 and the tension pulley 5.

FIG. 2 shows the actuator 6. It has a cylinder 8 in which is mounted an oil seal 9 near its top. A rod 10 slidably extends through the oil seal 9. The cylinder 8 has a built-in damper mechanism 11 for damping the pushing force applied to the rod 10 as it is pushed into the cylinder 8.

The hydraulic damper 11 has a plunger 12 connected to the bottom of the rod 10 and slidably received in a sleeve 13 mounted in the cylinder 8 at its lower part. A pressure chamber 14 and a reservoir chamber 15 are defined under and over the plunger 12, respectively. They communicate with each other through a passage 16 formed in the plunger 12 and the bottom end of the rod 10.

The cylinder 8 is filled with hydraulic oil except its upper portion, which is filled with air. A check valve 17 is provided at the bottom opening of the passage 16 to prevent the hydraulic oil in the pressure chamber 14 from flowing into the reservoir chamber 15 through the passage 16. Thus, the movement of the rod 10 is dumped as it is pushed into the cylinder. When the rod 10 is further pushed in, hydraulic oil in the pressure chamber 14 will leak into the reservoir chamber 15 through a gap formed between the sleeve 13 and the peripheral surface of the plunger 12 which is in sliding contact with the sleeve 13.

A spring 18 is mounted around the cylinder 8 with its bottom end supported on a flange 19 provided at the bottom of the cylinder 8.

A pair of coupling pieces 20 are provided at the bottom of the cylinder 8. The arm 1 has a portion inserted between the coupling pieces 20 and is coupled thereto by a pin 22 inserted in pin holes 21 formed in the arm 1 and the coupling pieces 20.

The spring 18 is supported at its other end by a spring seat 23 having a hole 24 in which is inserted the top end of the rod 10. The spring seat 23 is also provided with holes 25 in which is press-fitted a pin 26. Pin 26 further extends through a radial hole 27 formed in the rod 10 near its top end. The spring seat 23 is coupled to the rod 10 by the pin 26.

The hole 27 has a greater diameter than the pin 26 so that the pin 26 can be easily inserted into the hole 27.

The spring seat 23 has a coupling piece 28 formed with a hole 29 extending from side to side thereof. A tubular pivot shaft 30 is inserted in the hole 29. The pivot shaft 30 is mounted to the engine block 3 by tightening a bolt 31 through the coupling piece 28 into the engine block 3.

In operation, as the tension in the belt 7 increases, the arm 1 will pivot clockwise (in FIG. 1) about the pivot 2, pushing up the cylinder 8. The pressure in the pressure chamber 14 thus increases, moving the check valve 17 to close the passage 16. Consequently the upward movement of the cylinder 8 is damped by the hydraulic oil in the pressure chamber 14.

As the cylinder 8 is further pushed up, hydraulic oil in the pressure chamber 14 will begin to leak through gaps between the sliding surfaces of the plunger 12 and the sleeve 13 into the reservoir chamber 15, allowing the cylinder 8 to gradually rise. The cylinder 8 stops rising when the force urging the cylinder 8 upward becomes equal to the force of the spring 18.

When the belt 7 slackens, the cylinder 8 will be pushed down by the force of the spring 18. As the cylinder begins to descend, the pressure in the pressure chamber 14 decreases below the pressure in the reservoir chamber 15. Consequently the check valve 17 is moved to the position to open the passage 16, allowing hydraulic oil in the reservoir chamber 15 to flow into the pressure chamber 14 through the passage 16.

The cylinder 8 can thus quickly move downward. Hence the arm 1 is also moved quickly downward to stretch the belt 7, thus absorbing any slackening of the belt 7.

In this embodiment, the spring 18 of the actuator 6 is provided around the cylinder 8, so that its size is not limited by the size of the cylinder 8. Thus, it is possible to use any desired spring 18, without limits as to spring constant strength, so that the tension applied to the belt can be increased to any desired level.

It is also possible to use a spring 18 which has a large coil diameter and a low spring constant. Consequently minimizing the variation in tension applied to the belt. This makes it possible to prolong the life of the belt 7.

To assemble the actuator 6, the hydraulic damper mechanism 11 and the rod 10 are set in the cylinder 8, which is filled with hydraulic oil beforehand. The spring 18 is fitted around the cylinder 8. Next the spring seat 23 is fitted on the top end of the rod 10. Finally the pin 26 is press-fitted in the holes 25.

Since the spring 18 can be mounted after the hydraulic damper mechanism 11 is assembled, and since the spring seat 23 for supporting the spring 18 can be mounted simply by press-fitting the pin 26 into holes 25, the actuator 6 can be assembled extremely easily.

FIGS. 4–7 show various other kinds of actuators 6. The actuator shown in FIG. 4 has a gap 32 between the inner wall of the pivot shaft inserting hole 29 formed in the coupling piece 28 and the outer periphery of the pivot shaft 30. The top end of the rod 10, extending through the rod inserting hole 24, protrudes into the gap 32. This actuator is otherwise the same as that shown in FIG. 2. Thus the same elements shown in FIG. 2 are denoted by the same numerals and their description is omitted.

Figure 4:
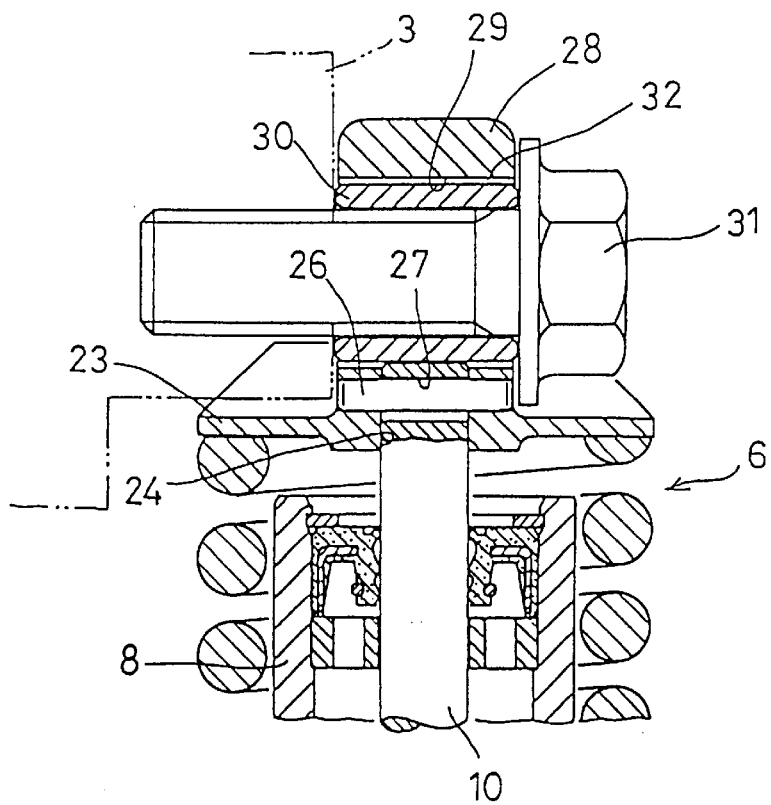
FIG. 4 is a partially sectional view of a different type of actuator.

As shown in FIG. 4, by forming the gap 32, the pivot shaft 30 abuts the rod 10 as the bolt 31 is tightened to fix the pivot shaft, so that the spring seat 23 and the rod 10 are coupled together with no play present at the coupling portion therebetween. This improves the responsiveness of the hydraulic damper mechanism 11.

Figure 5:
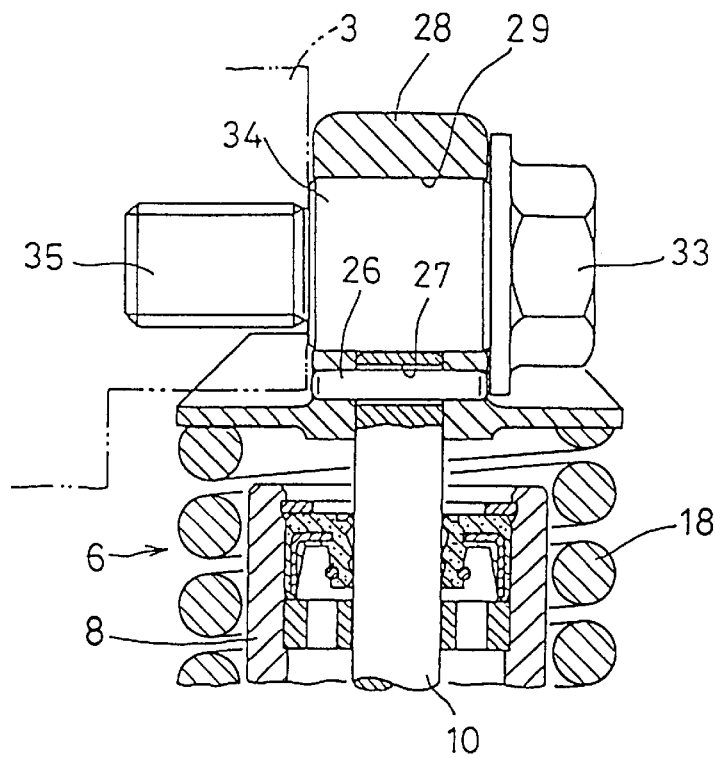
FIG. 5 is a partially sectional view of still another type of actuator.

The actuator 6 shown in FIG. 5 has a pivot shaft 34 having a head 33 and is inserted in the hole 29. The pivot shaft 34 has a threaded shaft 35 at its end which is adapted to be threaded into the engine block 3. Otherwise, this actuator is the same as that shown in FIG. 2. Thus, the same elements shown in FIG. 2 are denoted by the same numerals and their description is not repeated.

In this arrangement, the pivot shaft 30 is not needed; thus the actuator 6 of FIG. 5 can be manufactured at a lower cost.

Figure 6:
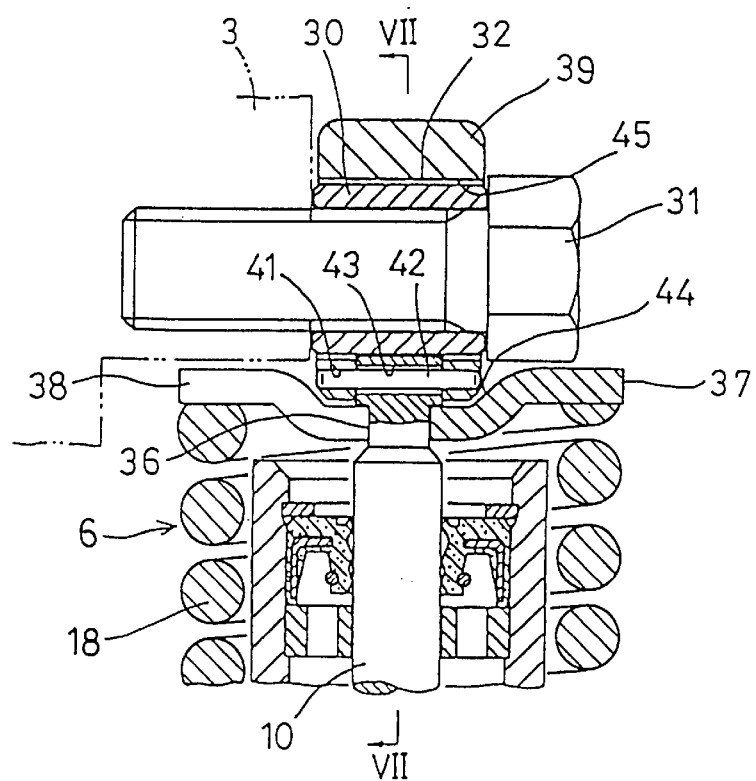
FIG. 6 is a partially sectional view of yet another type of actuator.
Figure 7:
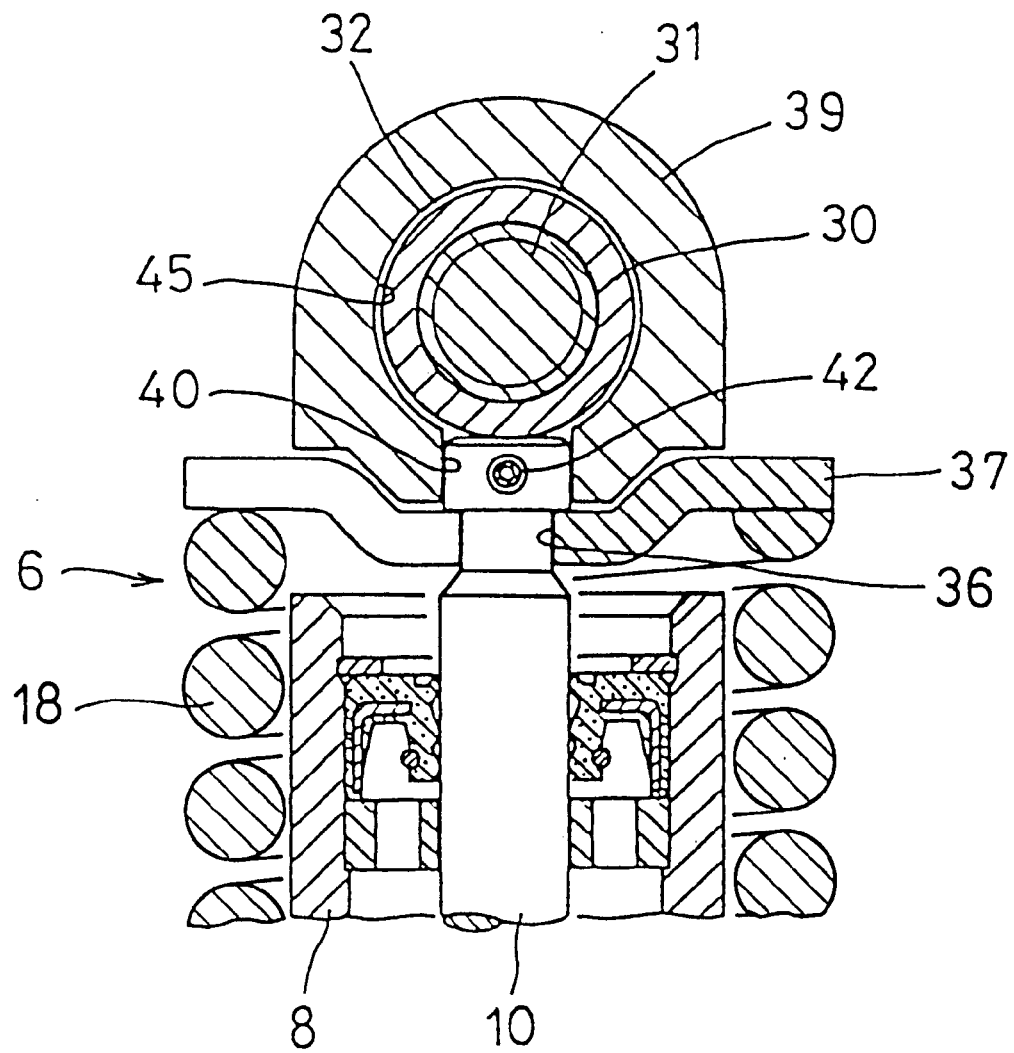
FIG. 7 is a partially sectional view taken along line VII—VII of FIG. 6.

The actuator 6 shown in FIGS. 6 and 7 has a rod 10 formed with a groove 36 near its top end, and a circular spring seat 37 for supporting the end of the tension spring 18. The spring seat 37 has a groove 38 extending from the circumference to the center thereof. By pushing the rod 10 through the spring seat 37, the spring seat can be mounted within groove 36 of the rod 10 that the road 10 protrudes from the spring seat 7.

The rod 10 has its top end inserted in a hole 40 formed in the bottom of a coupling piece 39. A pin 42 extends through a hole 43 formed in the rod 10. In addition, pin 42 pressfitted in a hole 41 formed in the coupling piece 39 so as to cross the hole 40 to couple the coupling piece 39 to the rod 10. The coupling piece 39 has its bottom portion seated in a recess 44 formed in the top of the spring seat 37 to prevent the spring seat 37 from coming out.

The coupling piece 39 is further formed with a hole 45 extending from side to side thereof. The tubular pivot shaft 30 is inserted in the hole 45 and is fastened to the engine block 3 by tightening the bolt 31.

As for the structures not mentioned above, this actuator is nothing different from that shown in FIG. 2. Thus, the same elements shown in FIG. 2 are denoted by the same numerals and their description is omitted.

In the arrangement of FIGS. 6 and 7, the spring seat 37 is inserted from one side of the actuator 6 until it engages the rod 10. In this state, it cannot move axially. Thus, the spring seat 37 can be easily set in position.

Also, the spring seat 37 is prevented from rattling by engaging the upper jaw of the groove 36 formed in the rod 10. This improves the responsiveness of the hydraulic damper mechanism 11.

Each of the actuators shown in FIGS. 4–7 has the coupling pieces 28 and 39 for coupling the free end of the rod 10 to the engine block 3 at the top end of the rod. Furthermore each of the actuators also has the coupling piece 20 for coupling the cylinder 8 to the arm 1 at the cylinder side. But instead, coupling pieces may be provided to couple the free end of the rod 10 to the arm 1 and to couple the cylinder 8 to the engine block 3.

The following are the advantages of this invention:

①The spring provided around the cylinder is not limited in its size. Thus, it is possible to use a spring with a low spring constant or one with a large coil diameter and a low spring constant. This provides a greater flexibility in applications where high belt tension or low spring constant is required.

②The spring can be mounted in the cylinder after the hydraulic damper and the rod are mounted. The spring seat can be easily coupled to the free end of the rod simply by inserting a pin. Thus, the actuator can be assembled easily.

③The actuator can be easily set in position simply by mounting it on the engine block by tightening the bolt and coupling it to the arm by inserting the pin.

④The gap provided between the inner wall of the pivot shaft inserting hole and the pivot shaft makes it possible to couple the rod and the spring seat with no play therebetween. The responsiveness of the hydraulic damper is thus improved.

⑤The spring seat is in engagement at its top with the upper jaw of the groove formed in the rod, so that the responsiveness of the hydraulic damper is improved further.

What is claimed is:

1. A hydraulic autotensioner apparatus comprising:
   a cylinder having an open end;
   a seal mounted in said cylinder to close said open end of said cylinder and thereby define a cylinder chamber adapted to seal hydraulic fluid;
   a rod extending from said cylinder and having a through hole at one end of said rod;
   a spring seat mounted on said one end of said rod and having a first hole with a first axis and a second hole with a second axis, said first axis intersecting said second axis;
   a pin located in said second hole and extending through said through hole of said rod and coupling said spring seat to said rod;
   a first coupling piece provided on one of said cylinder and said spring seat and adapted to couple said one of said cylinder and said spring seat to a stationary member;
   a second coupling piece provided on the other of said cylinder and said spring seat and adapted to couple said other of said cylinder and said spring seat to a pivot arm;
   a spring encircling said cylinder and being operably interposed between said spring seat and said second coupling piece; and
   a hydraulic damper having a plunger, mounted on said rod and being slidably received in said cylinder chamber, dividing said cylinder chamber into a pressure chamber and a reservoir chamber, said plunger having a passage therethrough fluidically connecting said pressure chamber and said reservoir chamber, and a check valve provided at an end of said passage which closes said passage when a pressure chamber pressure is greater than a reservoir chamber pressure.

2. The hydraulic autotensioner apparatus of claim 1 wherein said check valve is a ball valve.

3. The hydraulic autotensioner apparatus of claim 1 wherein said first coupling piece further includes a hole formed therein and a tubular pivot shaft located in said hole of said first coupling piece.

4. The hydraulic autotensioner apparatus of claim 1 wherein said first coupling piece further includes a hole formed therein and a pivot shaft located in said hole of said first coupling piece, said pivot shaft having a threaded shaft at one end thereof.

5. The hydraulic autotensioner apparatus of claim 1 wherein said first coupling piece is located on said spring seat and further includes a hole formed therein and a pivot shaft located in said hole of said first coupling piece, such that a gap is provided between an inner surface of said hole of said first coupling piece and an outer periphery of said pivot shaft, wherein a tip of said one end of said rod is located in said gap.

6. The hydraulic autotensioner apparatus of claim 1 wherein said spring is not enclosed by a housing.

7. The hydraulic autotensioner apparatus of claim 1, wherein said hydraulic damper further comprises:
   a sleeve positioned in said cylinder, said plunger being slidably received in said sleeve.

8. A hydraulic autotensioner apparatus comprising:
   an arm having a pivotal mounting portion for use in pivotally mounting said arm to a stationary member;
   a tension pulley rotatably mounted on an end of said arm;
   a belt engaged on said tension pulley; and
   an actuator coupled to said arm, said actuator having
      a cylinder having an open end;
      a seal mounted in said cylinder to close said open end of said cylinder and thereby define a cylinder chamber adapted to seal hydraulic fluid;
      a rod extending from said cylinder and having a through hole at one end of said rod,
      a spring seat mounted on said one end of said rod and having a first hole with a first axis and a second hole with a second axis, said first axis intersecting said second axis,
      a pin located in said second hole and extending through said through hole of said rod and coupling said spring seat to said rod,
      a first coupling piece provided on one of said cylinder and said spring seat and adapted to couple said one of said cylinder and said spring seat to the stationary member,
      a second coupling piece provided on the other of said cylinder and said spring seat and coupling said other of said cylinder and said spring seat to said arm,
      a spring encircling said cylinder and being operably interposed between said spring seat and said second coupling piece, and
      a hydraulic damper having a plunger, mounted on said rod and being slidably received in said cylinder chamber, dividing said cylinder chamber into a pressure chamber and a reservoir chamber, said plunger having a passage therethrough fluidically connecting said pressure chamber and said reservoir chamber, and a check valve provided at an end of said passage which closes said passage when a pressure chamber pressure is greater than a reservoir chamber pressure.

9. The hydraulic autotensioner apparatus of claim 8, wherein said hydraulic damper further comprises:
   a sleeve positioned in said cylinder, said plunger being slidably received in said sleeve.

10. The hydraulic autotensioner apparatus of claim 8 wherein said spring is not enclosed by a housing.

11. The hydraulic autotensioner apparatus of claim 8 wherein said check valve is a ball valve.

12. The hydraulic autotensioner apparatus of claim 8 wherein said first coupling piece further includes a hole formed therein and a tubular pivot shaft located in said hole of said first coupling piece.

13. The hydraulic autotensioner apparatus of claim 8 wherein said first coupling piece further includes a hole formed therein and a pivot shaft located in said hole of said first coupling piece, said pivot shaft having a threaded shaft at one end thereof.

14. The hydraulic autotensioner apparatus of claim 8 wherein said first coupling piece is located on said spring seat and further includes a hole formed therein and a pivot shaft located in said hole of said first coupling piece, such that a gap is provided between an inner surface of said hole of said first coupling piece and an outer periphery of said pivot shaft, wherein a tip of said one end of said rod is located in said gap.

15. A hydraulic autotensioner apparatus comprising:
   a cylinder having a flange located at a bottom end thereof and an open end;
   a seal mounted in said cylinder to close said open end of said cylinder and thereby define a cylinder chamber adapted to seal hydraulic fluid;
   a rod extending from said cylinder and having a groove and a through hole at a top end of said rod;
   a first coupling piece located at said bottom end of said cylinder and adapted to couple said cylinder to a pivot arm;
   a spring seat having a hole formed therethrough, said rod extending through said hole of said spring seat such that said spring seat engages in said groove of said rod;
   a second coupling piece having a first hole with a first axis, a second hole with a second axis, and a third hole, wherein said first axis intersects said second axis;
   a pin located in said second hole, extending through said through hole of said rod and coupling said second coupling piece to said top end of said rod;
   a tubular pivot shaft provided in said third hole;
   a spring encircling said cylinder and being interposed between said spring seat and said flange; and
   a hydraulic damper having a plunger, mounted on said rod and being slidably received in said cylinder chamber, dividing said cylinder chamber into a pressure chamber and a reservoir chamber, said plunger having a passage therethrough fluidically connecting said pressure chamber and said reservoir chamber, and a check valve provided at an end of said passage which closes said passage when a pressure chamber pressure is greater than a reservoir chamber pressure.

16. The hydraulic autotensioner apparatus of claim 15 wherein said check valve is a ball valve.

17. The hydraulic autotensioner apparatus of claim 15, wherein said hydraulic damper further comprises:
   a sleeve positioned in said cylinder, said plunger being slidably received in said sleeve.

18. The hydraulic autotensioner apparatus of claim 15 wherein said spring is not enclosed by a housing.

19. A hydraulic autotensioner apparatus comprising:
   an arm having a pivotal mounting portion for use in pivotally mounting said arm to a stationary member;
   a tension pulley rotatably mounted on an end of said arm;
   a belt engaged on said tension pulley;
   an actuator coupled to said arm; said actuator having
      a cylinder having a flange located at a bottom end thereof and an open end,
      a seal mounted in said cylinder to close said open end of said cylinder and thereby define a cylinder chamber adapted to seal hydraulic fluid,
      a rod extending from said cylinder and having a groove and a through hole at a top end of said rod,
      a first coupling piece located at said bottom end of said cylinder and coupling said cylinder to said arm,
      a spring seat having a hole formed therethrough, said rod extending through said hole of said spring seat such that said spring seat engages in said groove of said rod,
      a second coupling piece having a first hole with a first axis, a second hole with a second axis, and a third hole, wherein said first axis intersects said second axis,
      a pin located in said second hole, extending through said through hole of said rod and coupling said second coupling piece to said top end of said rod,
      a tubular pivot shaft provided in said third hole,
      a spring encircling said cylinder and being interposed between said spring seat and said flange, and
   a hydraulic damper having a plunger, mounted on said rod and being slidably received in said cylinder chamber, dividing said cylinder chamber into a pressure chamber and a reservoir chamber, said plunger having a passage therethrough fluidically connecting said pressure chamber and said reservoir chamber, and a check valve provided in an end of said passage which closes said passage when a pressure chamber pressure is greater than a reservoir chamber pressure.

20. The hydraulic autotensioner apparatus of claim 19, wherein said hydraulic damper further comprises:
   a sleeve positioned in said cylinder, said plunger being slidably received in said sleeve.

21. The hydraulic autotensioner apparatus of claim 19 wherein said check valve is a ball valve.

22. The hydraulic autotensioner apparatus of claim 19 wherein said spring is not enclosed by a housing.

23. A hydraulic autotensioner apparatus comprising:
   a cylinder;
   a rod extending from said cylinder and having a through hole at one end of said rod;
   a spring seat mounted on said one end of said rod and having a first hole with a first axis and a second hole with a second axis, said first axis intersecting said second axis;
   a pin located in said second hole and extending through said through hole of said rod and coupling said spring seat to said rod;
   a first coupling piece provided on one of said cylinder and said spring seat and adapted to couple said one of said cylinder and said spring seat to a stationary member;
   a second coupling piece provided on the other of said cylinder and said spring seat and adapted to couple said other of said cylinder and said spring seat to a pivot arm;
   a spring encircling said cylinder and being operably interposed between said spring seat and said second coupling piece, wherein said spring is not enclosed by a housing; and
   a hydraulic damper having a plunger, mounted on said rod and being slidably received in said cylinder, dividing an interior of said cylinder into a pressure chamber and a reservoir chamber, said plunger having a passage therethrough fluidically connecting said pressure chamber and said reservoir chamber, and a check valve provided at an end of said passage which closes said passage when a pressure chamber pressure is greater than a reservoir chamber pressure.

* * * * *